(12) United States Patent
Lu et al.

(10) Patent No.: US 10,811,983 B2
(45) Date of Patent: Oct. 20, 2020

(54) POWER ELECTRONIC CONVERSION UNIT AND SYSTEM

(71) Applicant: Delta Electronics (Shanghai) CO., LTD, Shanghai (CN)

(72) Inventors: Cheng Lu, Shanghai (CN); Wenfei Hu, Shanghai (CN); Tao Xia, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 15/880,678

(22) Filed: Jan. 26, 2018

(65) Prior Publication Data

US 2018/0262117 A1 Sep. 13, 2018

(30) Foreign Application Priority Data

Mar. 8, 2017 (CN) .......................... 2017 1 0133362

(51) Int. Cl.
*H02M 3/335* (2006.01)
*H02M 7/797* (2006.01)

(52) U.S. Cl.
CPC ....... *H02M 3/33569* (2013.01); *H02M 7/797* (2013.01); *H02M 3/335* (2013.01); *H02M 3/3353* (2013.01); *H02M 3/33561* (2013.01)

(58) Field of Classification Search
CPC . H02M 2001/0058; H02M 2007/4815; H02M 2007/4835; H02M 1/4241; H02M 7/523; H02M 7/66; H02M 7/68; H02M 7/757; H02M 7/483; H02M 3/335–33592; H02M 3/3353; H02M 3/33561; H02M 3/3381; H02M 3/33569; H02M 7/797; H02M 7/219

See application file for complete search history.

(56) References Cited

U.S. PATENT DOCUMENTS

2014/0313789 A1* 10/2014 Dujic ................ H02M 3/33507
363/21.01
2015/0001958 A1* 1/2015 Abe ...................... H02M 7/797
307/104

(Continued)

FOREIGN PATENT DOCUMENTS

CN 201369679 Y 12/2009
CN 101707443 A 5/2010

(Continued)

OTHER PUBLICATIONS

The CN1OA dated Apr. 17, 2019 by the CNIPA.

*Primary Examiner* — Thienvu V Tran
*Assistant Examiner* — Shahzeb K Ahmad
(74) *Attorney, Agent, or Firm* — Yunling Ren

(57) ABSTRACT

The present disclosure provides a power electronic conversion unit and a power electronic conversion system. The power electronic conversion unit includes: two AC/DC subunits, AC ports of which are coupled in series to form a first port; two half-bridge subunits, DC ports of which are coupled to DC ports of the two AC/DC subunits, respectively; and a transformer, wherein two terminals of a primary winding of the transformer are coupled to a midpoint of bridge arms of the two half-bridge subunits. And a power electronic conversion system comprises a plurality of power electronic conversion units.

16 Claims, 12 Drawing Sheets

(56) References Cited

U.S. PATENT DOCUMENTS

| | | | | |
|---|---|---|---|---|
| 2015/0097434 A1* | 4/2015 | Harrison | ............... | H02J 3/383 |
| | | | | 307/43 |
| 2015/0349649 A1* | 12/2015 | Zane | ............... | H02M 7/5387 |
| | | | | 363/21.03 |
| 2018/0159424 A1* | 6/2018 | Kolar | ............... | H02M 1/36 |
| 2018/0183335 A1* | 6/2018 | Fan | ............... | H02M 3/155 |
| 2018/0191268 A1* | 7/2018 | Caiafa | ............... | H02M 1/12 |

FOREIGN PATENT DOCUMENTS

| | | | |
|---|---|---|---|
| CN | 102291019 A | * | 12/2011 |
| CN | 101707443 B | | 5/2013 |
| CN | 103563232 A | | 2/2014 |
| CN | 203827195 U | | 9/2014 |
| CN | 104160588 A | | 11/2014 |
| CN | 104702114 A | | 6/2015 |
| CN | 104836424 A | | 8/2015 |
| CN | 104410063 B | | 3/2016 |
| CN | 105720840 A | | 6/2016 |
| EP | 3051680 A1 | | 8/2016 |

* cited by examiner

US 10,811,983 B2

POWER ELECTRONIC CONVERSION UNIT AND SYSTEM

CROSS-REFERENCE TO RELATED APPLICATIONS

This application claims priority to Chinese Patent Application No. 201710133362.1, filed Mar. 8, 2017, the entire contents of which are incorporated herein by reference.

TECHNICAL FIELD

The present disclosure generally relates to power electronics, and more particularly, to a power electronic conversion unit and a power electronic conversion system.

BACKGROUND with the development of distributed generation technology with new energy and the increasing number of Direct Current (DC) devices, the demand for the low voltage DC distribution is increasing. Conventional solutions usually use a power frequency transformer to convert the medium voltage alternating current (MVAC) into low voltage alternating current, and then use an AC/DC converter to convert the low voltage alternating current into the low voltage direct current (LVDC). Power electronic transformer is a power conversion device which converts the medium voltage alternating current into the low voltage direct current using a high frequency isolation circuit. Compared with the conventional solutions based on the power frequency transformer, the power electronic transformer has higher power density and efficiency.

Most of existing power electronic transformers use the structure shown in FIG. 1. In such structure, cascaded AC/DC converters form a former stage to convert the input medium voltage alternating current into multiple intermediate DC currents, commonly known as a cascaded H-bridge (CHB) structure; the DC/DC converters in the latter stage convert the intermediate DC currents to low voltage direct current and perform high frequency isolation, and the output terminals of low voltage direct current are coupled in parallel. Each pair of AC/DC converter and DC/DC converter form a modular power electronic conversion unit. In order to match higher voltage level of MVAC, power electronic transformer usually requires a larger number of units to couple to AC side in series, and the system complexity and costs will rise due to over large number of cascaded units. The number of cascaded units depends on the level of the AC input voltage of each unit, which in turn depends on the topology and the employed power semiconductor devices of each unit.

However, it is difficult for existing power electronic transformer units to achieve a good balance between withstand voltage capability and the number of units, and most power electronic transformer units have the problem of complicated structure and high costs.

The information disclosed in the above-mentioned background section is for the purpose of reinforcing the understanding of the background of the present disclosure and may therefore include information that does not constitute prior art known to those of ordinary skill in the art.

SUMMARY

The present disclosure provides a power electronic conversion unit and a power electronic conversion system.

According to an aspect of embodiment of the present disclosure, there is provided a power electronic conversion unit, including:

two AC/DC subunits, AC ports of which are coupled in series to form a first port;

two half-bridge subunits, DC ports of which are coupled to DC ports of the two AC/DC subunits, respectively; and a transformer, wherein two terminals of a primary winding of the transformer are coupled to a midpoint of bridge arms of the two half-bridge subunits.

According to another aspect of embodiments of the present disclosure, there is provided a power electronic conversion system including a plurality of power electronic conversion units as mentioned above.

BRIEF DESCRIPTION OF THE DRAWINGS

The drawings show embodiments consistent with the present disclosure, and, together with the description, serve to explain the principles of the present disclosure. It will be apparent that the drawings in the following description are merely examples of the present disclosure, and not by the way of limitation, in the figures of the accompanying drawings.

DETAILED DESCRIPTION

Specific implementations of the present application will be described in further detail with reference to the accompanying drawings. The example implementation, however, may be embodied in various forms, and should not be construed as being limited to the implementations described herein; rather, it is more comprehensive and complete to the present disclosure by providing these example implementations, and the gist of these example implementations could be conveyed to those skilled in the art fully. The described features, structures or characters may be combined in one or more embodiments in any suitable manner. In the following description, numerous specific details are provided so as to allow a full understanding of the embodiments of the present disclosure. However, those skilled in the art will recognize that the technical solutions of the present disclosure may be implemented without one or more of the specific details, or other structures, components, steps, methods and so on may be used. In other instances, well-known technical structures, components or operations are not shown or described in detail to avoid obscuring aspects of the present disclosure. In the present disclosure, if it is referred to that an element is "coupled to . . . ", the term may mean "electrically coupled to". The term "coupled or connection" may also refer to interactions or cooperation between two or more elements. In addition, although terms such as "first". "second" are used to describe different elements, it should be understood that such words are used to distinguish elements or operations which are described using the same terminology. Unless otherwise stated, such words are not intended to imply any specific order or sequence or to limit the scope of the present disclosure.

In addition, the drawings are merely illustrative of the present disclosure and are not drawn based on actual scale. The same reference signs represent the same or similar elements and repeated descriptions thereof will be omitted. Some block diagrams represent functional entities and are not necessarily corresponding to physically or logically independent entities. The functional entities can be realized in software form, or may be implemented in one or more hardware modules or integrated circuits.

Figure 1:
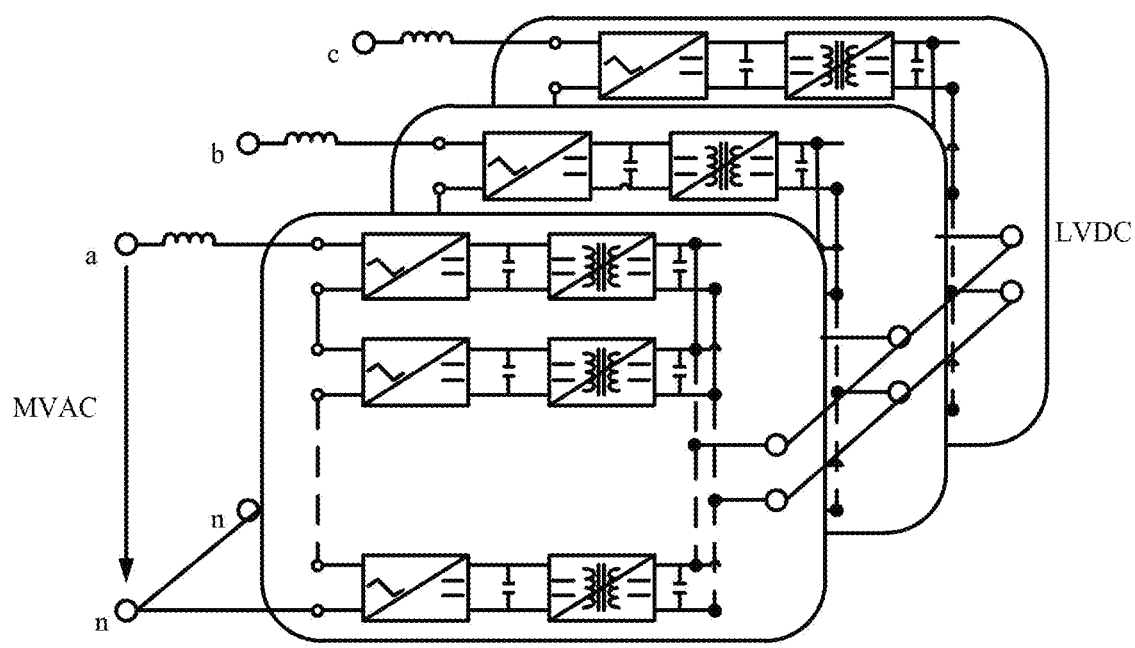
FIG. 1 is a schematic diagram of a structure of a power electronic transformer system.
Figure 2:
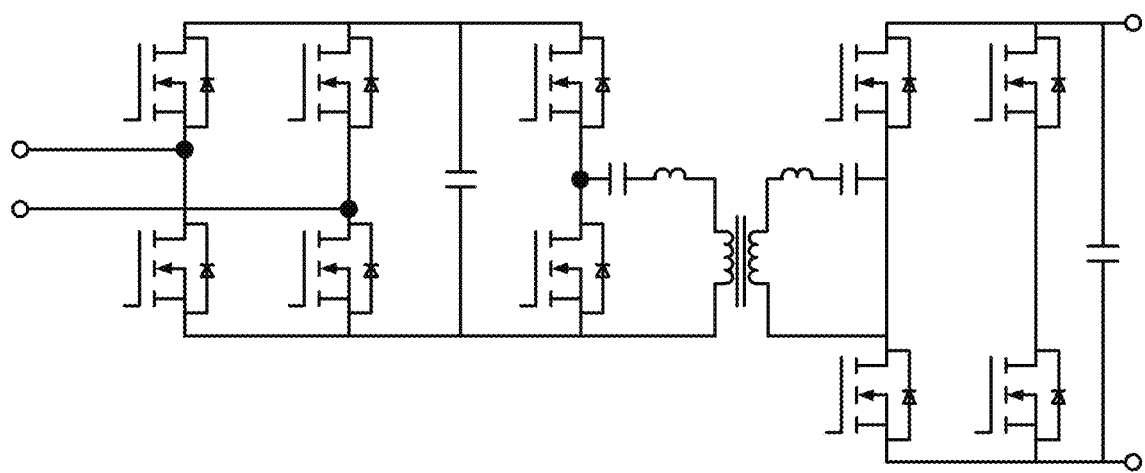
FIG. 2 is a schematic diagram of a structure of a power electronic transformer unit.

FIG. 2 shows a technical scheme for a power electronic conversion unit of FIG. 1. The AC/DC converter section in the former stage of the power electronic conversion unit is an H-bridge, the isolation DC/DC converter in the latter stage is coupled to the AC/DC converter in the former stage via a DC link capacitor. The DC/DC converter may be a PWM converter or a resonant converter. Since the AC voltage which can be withstood by the AC/DC converter in the two-level H-bridge structure is relatively low, the system needs a large number of cascaded power electronic conversion units to meet the input voltage of above 10 kV. Also, each unit needs a corresponding isolation transformer, mechanical components, optical fiber connectors and so on, thereby resulting in high complexity and costs of the power electronic conversion system.

Figure 3:
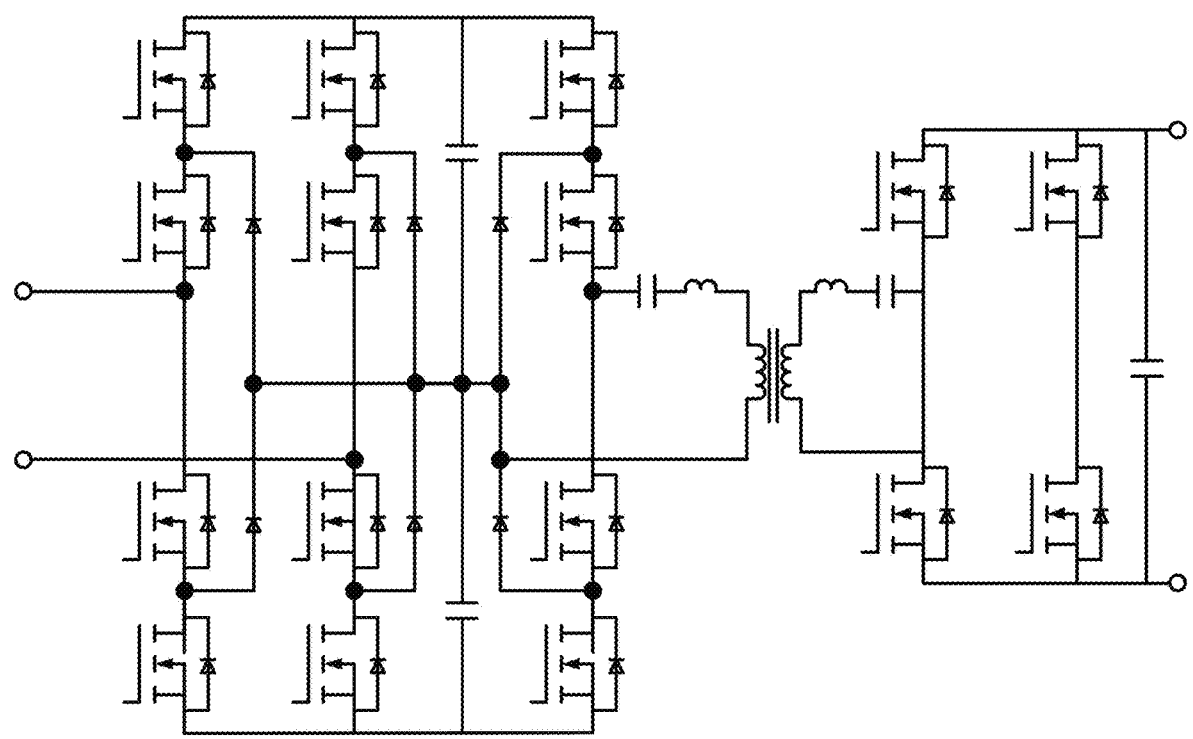
FIG. 3 is another schematic diagram of a structure of a power electronic transformer unit.

In order to improve the deficiency of the power electronic conversion unit shown in FIG. 2 which is based on the two-level H-bridge scheme, a unit topology based on a neutral-point clamped three-level H-bridge structure is proposed in FIG. 3. As compared with the topology in FIG. 2, the unit topology in FIG. 3 has doubled switches at the primary winding side to withstand doubled input voltage, thereby reducing the number of cascaded units. For the system, the number of the switches keeps unchanged, the number of the isolation transformers is halved, and the number of the rectifier circuits at the secondary side is halved. However, in the unit topology shown in FIG. 3, six clamping diodes are needed, and the conduction loss of the diodes is larger than that of MOSFETs under small current, thereby resulting in low system efficiency. In a word, the unit topology in FIG. 3 is not benefit for the costs and efficiency of the power electronic transformer system.

Figure 4:
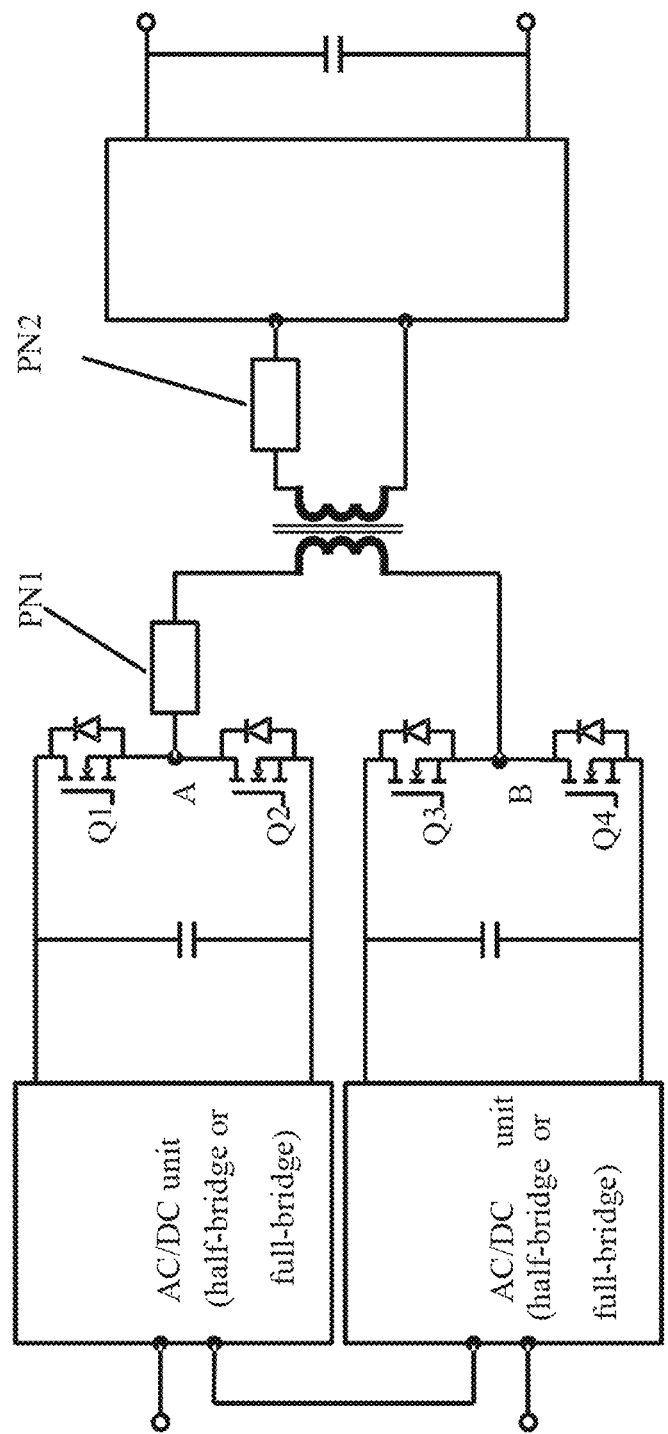
FIG. 4 is a schematic diagram illustratively showing a structure of a power electronic conversion unit according to an embodiment of the present disclosure.

In view of the above, we can see that choosing appropriate unit topology is the key to the design of power electronic transformer system. Thus, in an embodiment of the present disclosure, a power electronic conversion unit is provided. As shown in FIG. 4, the power electronic conversion unit includes: two AC/DC subunits, AC ports of which are coupled in series to form a first port; two half-bridge subunits, DC ports of which are coupled to DC ports of the two AC/DC subunits, respectively; and a transformer, wherein two terminals of a primary winding of the transformer are coupled to a midpoint of bridge arms of the two half-bridge subunits. The midpoint of the bridge arms of the two half-bridge units constitutes a second port.

In the power electronic conversion unit according to the embodiment and the power electronic conversion system formed by the power electronic conversion unit. AC ports of the two AC/DC subunits are coupled in series, DC ports of the two AC/DC subunits are coupled to the DC ports of the two half-bridge subunits respectively, and thus under the same voltage withstanding capability, the topology of the power electronic conversion unit becomes simple, less devices are needed, and higher power density and smaller conduction loss can be achieved. Further, in the power electronic conversion system formed by the power electronic conversion units, the number of the cascaded power electronic conversion units is reduced, and simple system topology and lower costs can be achieved.

In some embodiments, the AC/DC subunits may be half-bridge circuits or full-bridge circuits. When each AC/DC subunit operates as an independent circuit, the AC port of the AC/DC subunit inputs or outputs alternating current, and the DC port of the AC/DC subunit inputs or outputs direct current. For example, if the AC/DC subunit is a half-bridge circuit, both terminals of the bridge arm form a DC port of the AC/DC subunit, and one terminal of the bridge arm and the midpoint of the bridge arms form an AC port of AC/DC subunit. If the AC/DC subunit is a full-bridge circuit, the two terminals of the bridge arms form the DC port of the AC/DC subunit, and the midpoints of the two arms form the AC port of the AC/DC subunit. Similarly, the DC port of the half-bridge subunit is formed by the two terminals of the bridge arms.

The first port of the power electronic conversion unit is used for inputting or outputting first alternating current, and the second port of the power electronic conversion unit is used for inputting or outputting second alternating current. The two AC/DC subunits and the two half-bridge subunits cooperatively realize the conversion between the first alternating current and the second alternating current. The present disclosure does not limit the direction of transmission of electrical energy, which can be transmitted from left to right, can be transmitted from right to left, or in both directions. For example, if the switching devices in the power electronic conversion unit of the embodiment are fully-controlled type switching devices, bidirectional flow of power can be realized. The switching devices in the power electronic conversion unit may be MOSFETs, or IGBTs, and may be other fully-controlled type switching devices such as IGCTs and GTOs, and so on, and embodiments of the present disclosure are not limited to this.

As shown in FIG. 4, in the embodiment, in order to filter out undesired voltage components, the power electronic conversion unit may also include a first passive network PN1 which includes an inductor and/or a capacitor. The first passive network PN1 couples to the midpoint of the bridge arms of the two half-bridge subunits in series to the primary winding of the transformer. For example, the power electronic conversion unit may not include the first passive network PN1, that is, the midpoint of the bridge arms of the half-bridge subunits may be directly coupled to the primary winding of the transformer, and such arrangement also falls within the scope of the present disclosure.

In addition, in the embodiment, the power electronic conversion unit may further include a secondary side AC/DC conversion unit, an AC port of the secondary side AC/DC conversion unit is coupled to a secondary side winding of the transformer to receive third alternating current from the secondary side winding or output third alternating current to the secondary side winding. Further, in order to filter out undesired voltage components, the power electronic conversion unit may further include a second passive network PN2 including a capacitor and/or an inductor, the AC port of the secondary side AC/DC conversion unit is coupled to the secondary winding of the transformer via the second passive network PN2. For example, the power electronic conversion unit may not include the second passive network, that is, the AC port of the secondary side AC/DC conversion unit may be directly coupled to the secondary winding of the transformer.

In the embodiment, each of the first passive network PN1 and the second passive network PN2 may be a series resonant network or a parallel resonant network or other network including inductor(s) or capacitor(s), and the present disclosure does not impose specific limitations on this.

Further, the secondary side AC/DC conversion unit may be a full-bridge rectifier circuit, a full-wave rectifier circuit, a full-bridge bidirectional circuit and the like, and the present disclosure does not impose specific limitations on this. The secondary side AC/DC conversion unit allows the electrical energy to be transmitted from left to right, from right to left or in both directions.

Figure 5:
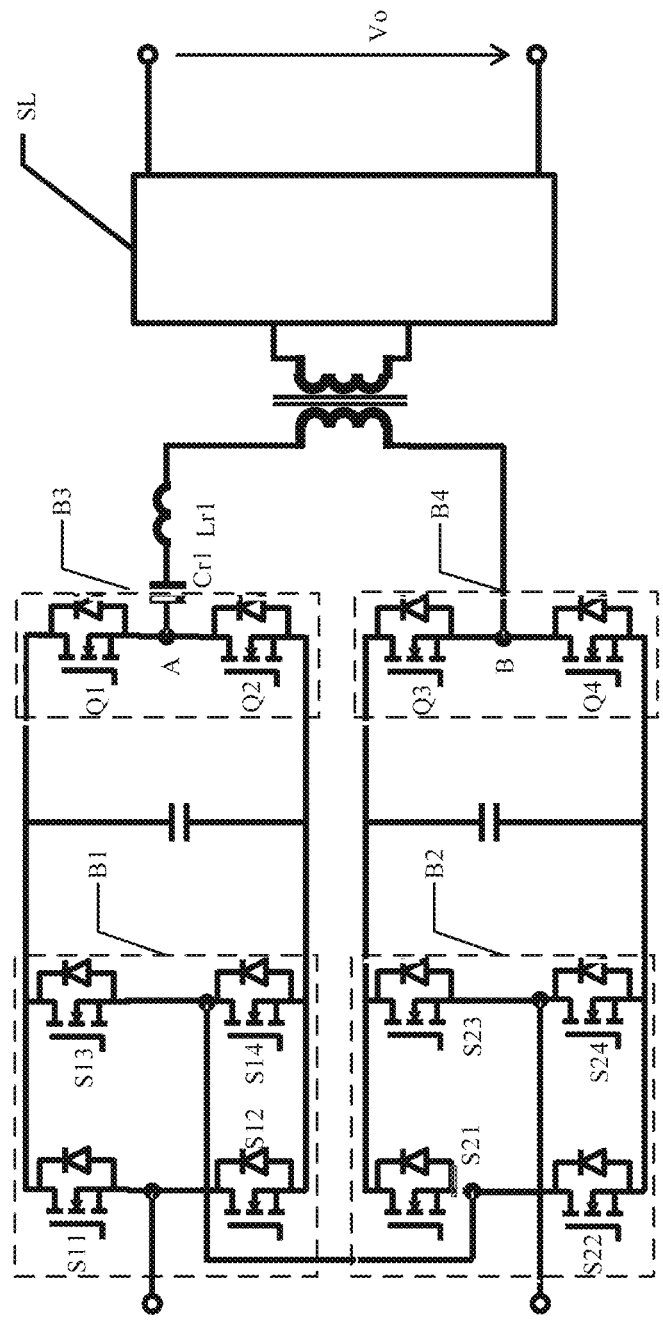
FIG. 5 is a schematic diagram illustratively showing a structure of a power electronic conversion unit according to another embodiment of the present disclosure.

As shown in FIG. 5, the two AC/DC subunits are full-bridge circuits B1 and B2, and the two half-bridge subunits are bridge arms B3 and B4. The operation principle of the circuit will be described with an example that the electrical energy is transmitted from left to right. The full-bridge circuit B1 including switches S11, S12, S13 and S14 and the second full-bridge circuit B2 including switches S21, S22, S23 and S24 are cascaded to form a first rectifier circuit which converts the input first alternating current into direct current. The full-bridge circuit including switches S13, S14, Q1 and Q2 and the full-bridge circuit including the switches S21, S22, Q3 and Q4 are cascaded to form a first inverter circuit which is coupled to the primary winding of the high frequency isolation transformer to convert the direct current into a high frequency square wave voltage, i.e., the second alternating current. A secondary AC/DC conversion unit SL converts high frequency square wave voltage into a low voltage direct current Vo. In the power electronic conversion unit, the bridge arm including S13 and S14 and the bridge arm including S21 and S22 are shared by the first rectifier circuit and the first inverter circuit, that is, the bridge arm including S13 and S14 and the bridge arm including S21 and S22 are common bridge arms. In the embodiment, by sharing of the bridge arms, the topology of the power electronic conversion unit is simplified.

Further, Lr1 and Cr1, which may be resonant devices, form the first passive network that may be used to filter out undesired voltage components or to adjust the waveform input to the primary winding. In the embodiment, the power electronic conversion unit may not include the first passive network, that is, the midpoints of the bridge arms of the two half-bridge subunits may be directly coupled to two terminals of the primary winding of the transformer, respectively, and such arrangement also falls within the scope of the present disclosure. Similarly, the secondary side of the power electronic conversion unit may also include a second passive network, and repeated description will be omitted here.

In addition, all the devices in the power electronic conversion unit can be operated bi-directionally, and the power electronic conversion unit can realize bidirectional power conversion. As shown in FIG. 5, the switching devices are MOSFETs, but the switching devices of the present disclosure is not limited to this, for example, the switching devices may also be other fully-controlled type switching devices such as IGBTs, IGCTs or GTOs, and these examples also fall within the scope of the present disclosure.

Further, the first inverter circuit, the secondary side AC/DC conversion unit SL, and the high frequency isolation transformer may constitute an isolation DC/DC converter. For example, the DC/DC converter may be a resonant converter or a PWM (Pulse Width Modulation) converter, but the DC/DC converter in the embodiments of the present disclosure is not limited to this, for example, the DC/DC converter may be other type of converter such as Pulse Frequency Modulation (PFM) converter, and such example also falls within the scope of the present disclosure. The all above-described DC/DC converter can be a bidirectional converter and the present disclosure does not impose specific limitations on the direction of electrical energy of the DC/DC converter.

Further, the secondary side AC/DC conversion unit SL may be a full-bridge rectifier circuit, a full-wave rectifier circuit, a full-bridge bidirectional circuit, or the like, and the present disclosure does not impose specific limitations on this.

Figure 6:
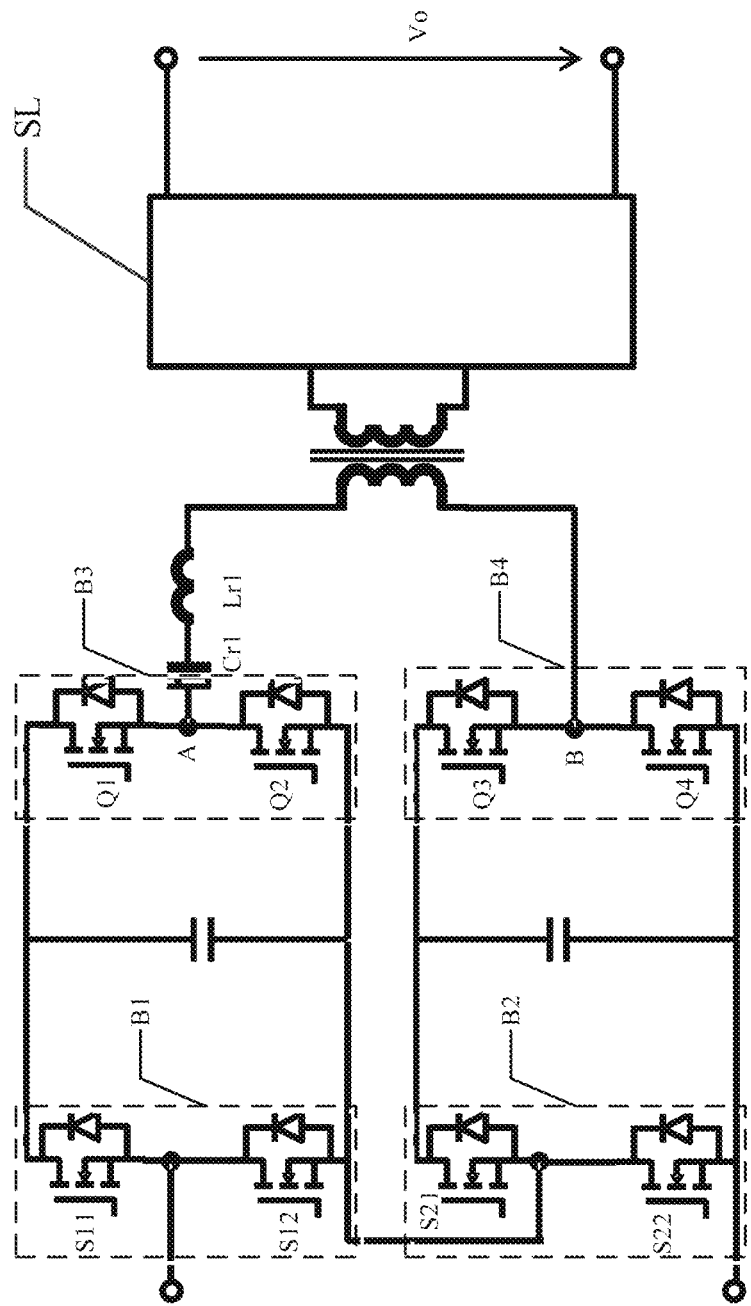
FIG. 6 is a schematic diagram illustratively showing a structure of a power electronic conversion unit according to yet another embodiment of the present disclosure.

FIG. 6 is a schematic diagram illustratively showing a power electronic conversion unit according to another embodiment of the present disclosure. The power electronic conversion unit in FIG. 6 differs from the power electronic conversion unit in FIG. 5 in that the AC/DC subunits of the power electronic conversion unit in FIG. 6 are half-bridge circuits. The two AC/DC subunits are half-bridge circuits B1 and B2, and the two half-bridge subunits are bridge arms B3 and B4.

Specifically, the half-bridge circuit B1 including the switches S11 and S12 and the half-bridge circuit B2 including the switches S21 and S22 are cascaded to form a first rectifier circuit to convert the input first alternating current into direct current; full-bridge circuit including the switches S11, S12, Q1 and Q2 and the full-bridge circuit including switches S21, S22, Q3 and Q4 are cascaded to form a first inverter circuit which is coupled to a primary winding of a high frequency isolation transformer to convert the direct current into high frequency square wave voltage, i.e., the second alternating current. A secondary AC/DC conversion unit SL converts high frequency square wave voltage into a low voltage direct current Vo. In the power electronic conversion unit, the bridge arm including S11 and S12 and the bridge arm including S21 and S22 are shared by the first rectifier circuit and the first inverter circuit, that is, the bridge arm including S11 and S12 and the bridge arm including S21 and S22 are common bridge arms.

Besides, the other parts of the power electronic conversion unit in FIG. 6 are substantially the same as that of the power electronic conversion unit in FIG. 5 and thus repeated descriptions will be omitted here.

Figure 7:
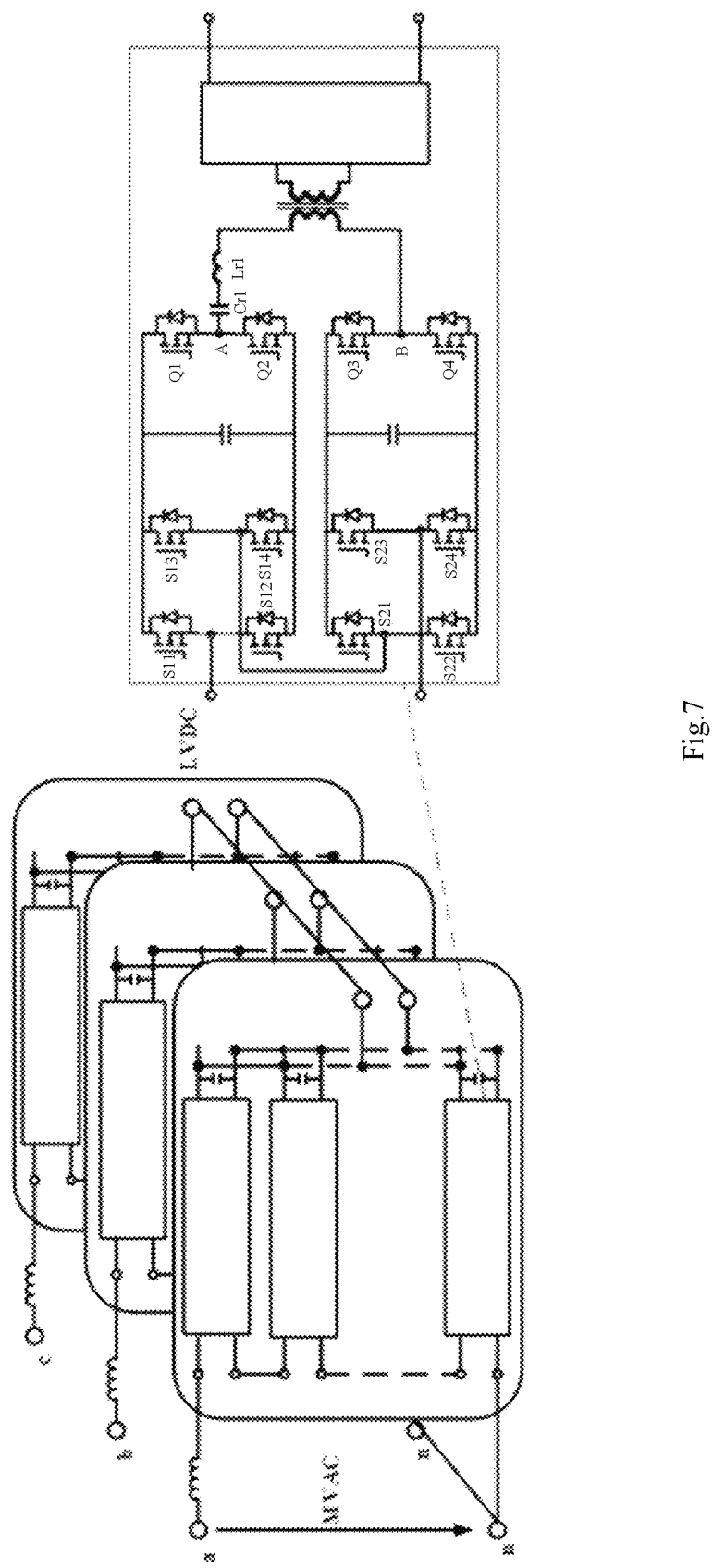
FIG. 7 is a schematic diagram illustratively showing a structure of a power electronic conversion system according to an embodiment of the present disclosure.

FIG. 7 illustratively shows a first power electronic conversion system which is based on the power electronic conversion unit in FIG. 5. The power electronic conversion unit may be coupled to a medium voltage grid via a reactor. As shown in FIG. 7, the left side is the first power electronic conversion system based on the power electronic conversion unit in FIG. 5, the right side is the power electronic conversion unit in FIG. 5, and the portion in the rectangular block of the left side is the power electronic conversion unit in the right side. Each of the AC/DC subunits of the power electronic conversion units in the power electronic conversion system is a full-bridge circuit, first ports of the power electronic conversion units based on the full-bridge structure are coupled in series, and first ports coupled in series can be coupled to the MVAC grid via a reactor. In some embodiments, the AC/DC subunits of the power electronic conversion units in the power electronic conversion system are cascaded to form a cascaded H-bridge structure.

Figure 10:
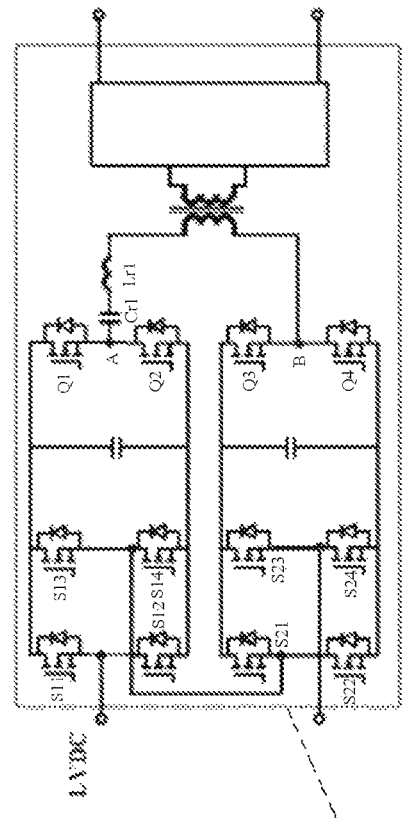
FIG. 10 is a schematic diagram illustratively showing a structure of a power electronic conversion system according to yet another embodiment of the present disclosure.
Figure 10:
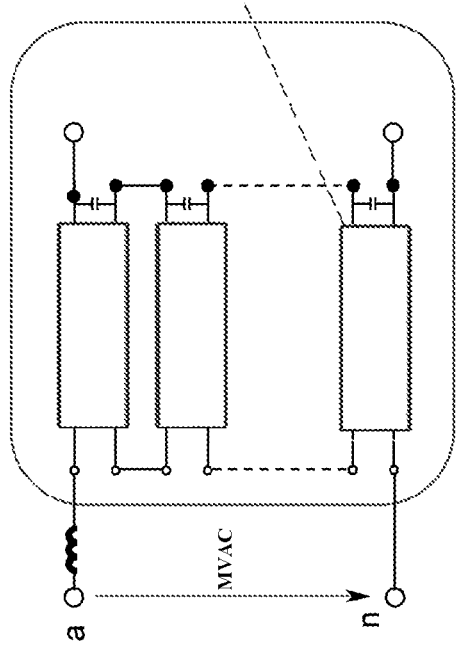
Figure 11:
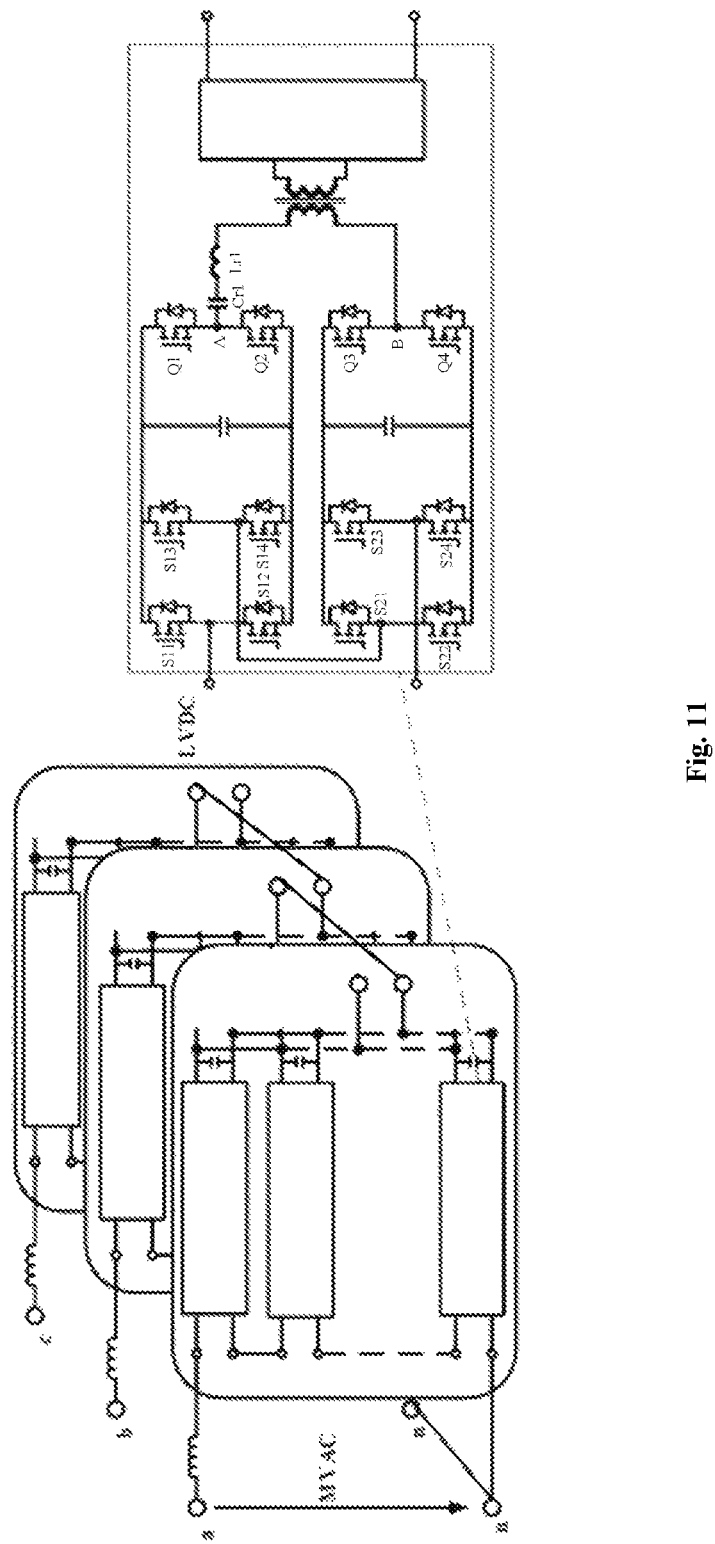
FIG. 11 is a schematic diagram illustratively showing a structure of a power electronic conversion system according to yet another embodiment of the present disclosure.

Further, the power electronic conversion system may include a plurality of secondary side AC/DC conversion units, and an AC port of the plurality of AC/DC conversion units is coupled to a secondary winding of a transformer in a corresponding power electronic unit. The DC ports of secondary side AC/DC conversion units are coupled to form a LVDC port. In some embodiments, the DC ports of the secondary side AC/DC conversion units of the power electronic conversion units are coupled in parallel, but embodiments of the present disclosure are not limited to this; for example, as shown from FIG. 10 to FIG. 12, the DC ports of the secondary side AC/DC conversion units of the power electronic conversion units may be coupled in series, or a part of the DC ports of the plurality of secondary side AC/DC conversion units are coupled in series and the other part of the DC ports of the plurality of secondary side AC/DC conversion units are coupled in parallel, or there is no connection between DC ports of the plurality of secondary side AC/DC conversion units, i.e., the DC ports of the plurality of secondary side AC/DC conversion units are independent from each other. All these examples also fall within the scope of the present disclosure, that is, the present disclosure does not impose specific limitations on the connection manner of the DC ports of the secondary side AC/DC conversion units. In addition, the power electronic conversion system can be, as a whole, a single-phase structure or a three-phase structure, and the present disclosure does not impose specific limitations on this. For example, in FIG. 7, the power electronic conversion system is a three-phase structure, and the DC ports of the secondary side AC/DC conversion units of the power electronic conversion units are coupled in parallel.

Figure 8:
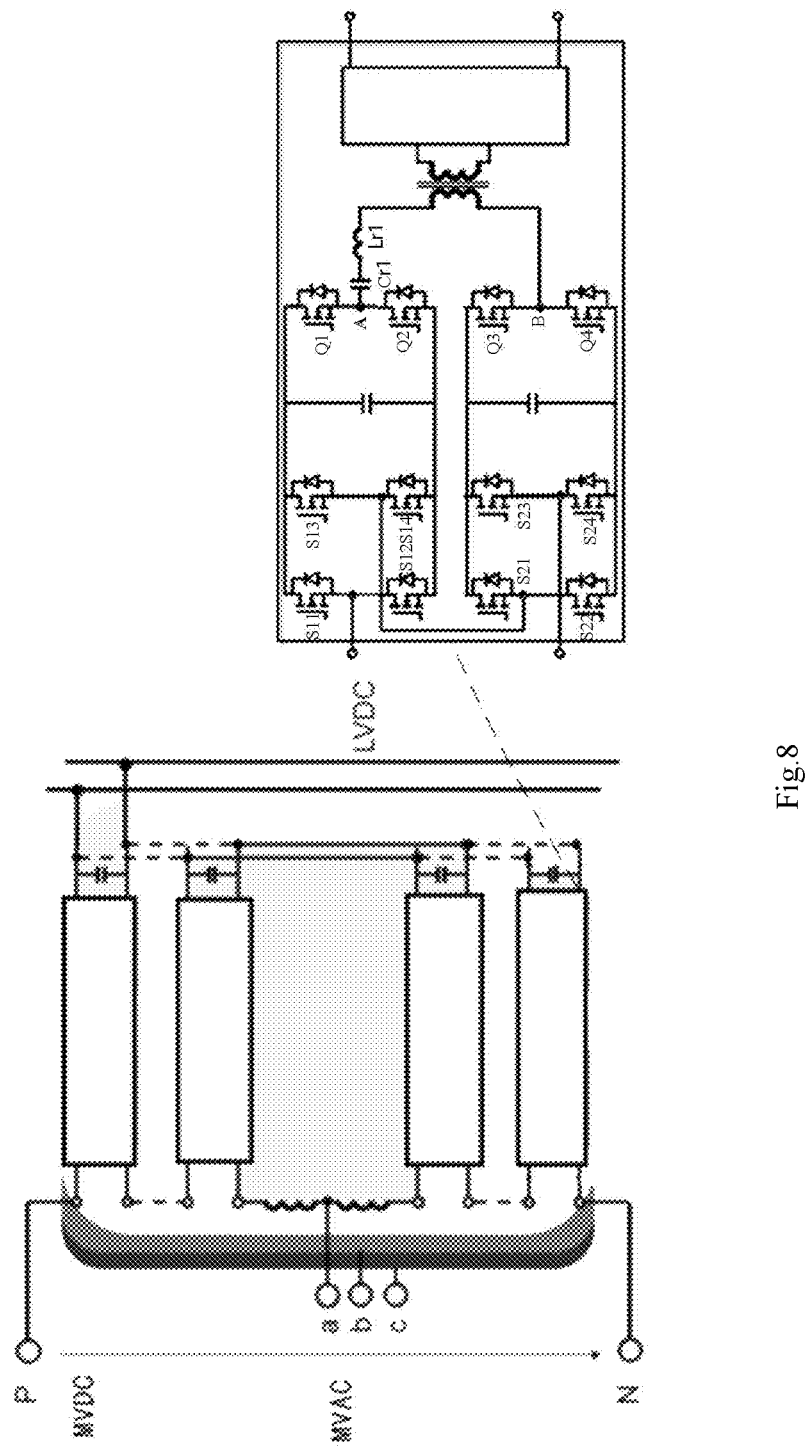
FIG. 8 is a schematic diagram illustratively showing a structure of a power electronic conversion system according to another embodiment of the present disclosure.

FIG. 8 illustratively shows a second power electronic conversion system which is based on the power electronics conversion unit in FIG. 5. In the second power electronic conversion system, the first ports of the cascaded power conversion units based on the full-bridge structure are stacked in the form of Modular Multilevel Converter (MMC). An upper bridge arm and a lower bridge arm of the MMC structure are coupled to the MVAC grid via a reactor. The other terminals of the upper and lower bridge arms constitute the medium voltage direct current port PN of the MMC structure which can be coupled to a MVDC grid. Besides, the second power electronic conversion system may further include a plurality of secondary side AC/DC conversion units, and the AC port of the plurality of AC/DC conversion units is coupled to a secondary winding of a transformer in a corresponding power electronic unit. The DC ports of the secondary side AC/DC conversion units of the power electronic conversion units are coupled to form an LVDC port.

Further, the AC/DC subunits of the power electronic conversion units in the second power electronic conversion system are full-bridge circuits, but embodiments of the present disclosure are not limited to this, for example, the AC/DC subunits may also be half-bridge circuits, or a part of AC/DC subunits are full-bridge circuits and the other part of the AC/DC subunits are half-bridge circuit, and so on, and such examples also fall within the scope of the present disclosure.

Figure 9:
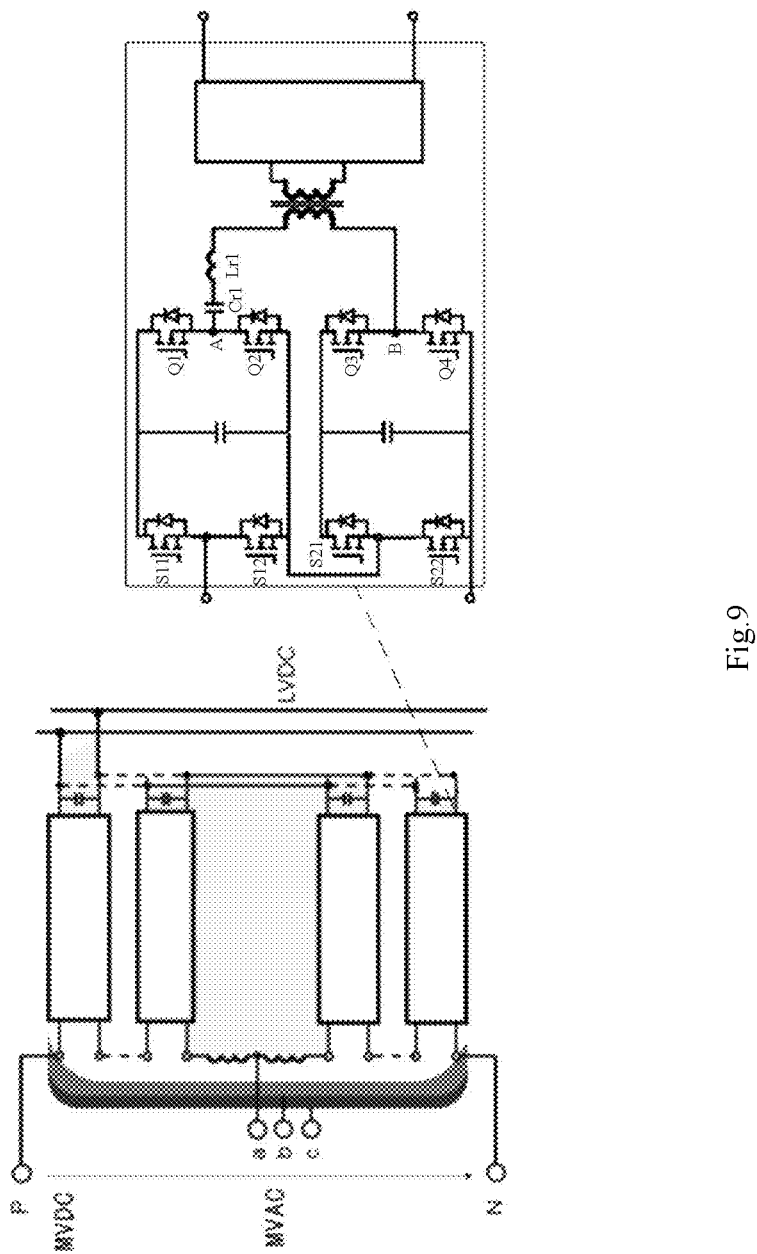
FIG. 9 is a schematic diagram illustratively showing a structure of a power electronic conversion system according to yet another embodiment of the present disclosure.

FIG. 9 illustratively shows a third power electronic conversion system based on the power electronic conversion unit in FIG. 6. In the third power electronic conversion system, the first ports of the cascaded power conversion units based on the half-bridge structure are stacked in the form of MMC. An upper bridge arm and a lower bridge arm of the MMC structure are coupled to the MVAC grid via a reactor. The other terminals of the upper and lower bridge arms constitute the medium voltage direct current port PN of the MMC structure which can be coupled to a MVDC grid. Besides, the third power electronic conversion system may further include a plurality of secondary side AC/DC conversion units, and an AC port of the plurality of AC/DC conversion units is coupled to a secondary winding of a transformer in a corresponding power electronic conversion unit. The DC ports of the secondary side AC/DC conversion units of the power electronic conversion units are coupled to form a LVDC port.

Figure 12:
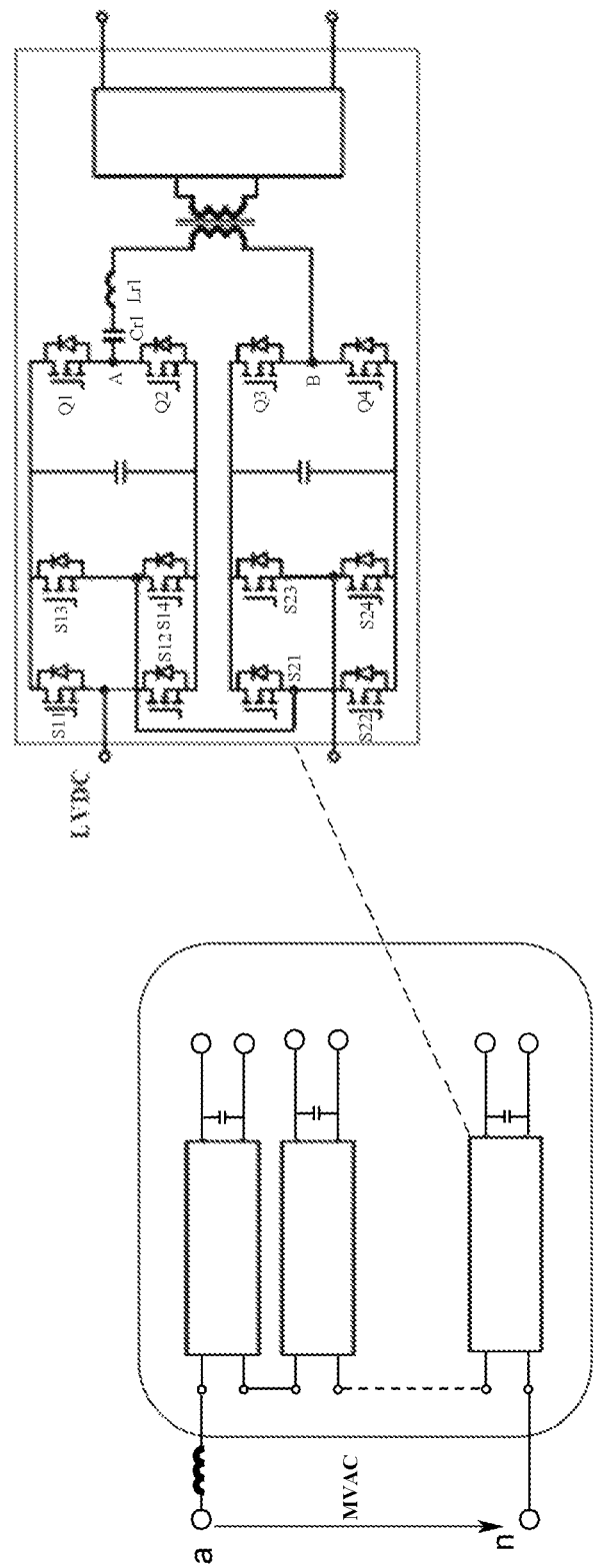
FIG. 12 is a schematic diagram illustratively showing a structure of a power electronic conversion system according to yet another embodiment of the present disclosure.

Furthermore, in FIGS. 8 and 9, the DC ports of the plurality of secondary side AC/DC conversion units in the power electronic conversion units are all coupled in parallel or coupled in series, or a part of the DC ports are coupled in series, and the other part of the DC ports are coupled in parallel; or there is no connection between DC ports of the plurality of secondary side AC/DC conversion units, i.e., the DC ports of the plurality of secondary side AC/DC conversion units are independent from each other (as shown in FIG. 12), and the present disclosure does not impose specific limitations on this. In addition, the power electronic conversion system can be, as a whole, a single-phase structure or a three-phase structure. For example, in FIGS. 8 and 9, the power electronic conversion system is a three-phase structure as a whole, and the DC ports of the secondary side AC/DC conversion units of the power electronic conversion units are coupled in parallel.

Finally, the application fields of the power electronic conversion unit and the power electronic conversion system of the present disclosure include but are not limited to: medium and high voltage power electronic transformer systems, grid-coupled inverter systems, energy storage inverter systems, new energy generation systems, charging piles or charging stations, data centers, electrified transportation systems, micro-grid systems composed of distributed generation units, energy storage units and local loads, and so on.

Other embodiments of the present disclosure will be readily apparent to those skilled in the art upon consideration of the specification and practice of the invention disclosed herein. The present disclosure is intended to cover any variations, uses, or adaptations that follow the general principles of the present disclosure, and includes the common general knowledge or conventional technical means in the art without departing from the present disclosure. The specification and examples are illustrative only, and the true scope and spirit of the disclosure is defined by the claims.

It should be understood that this disclosure is not limited to the precise constructions described above and shown in the accompanying drawings, and that various modifications and changes may be made without departing from the scope of the present disclosure. The scope of the present disclosure is defined only by the appended claims.

What is claimed is:

1. A power electronic conversion unit, comprising:
two AC/DC subunits, AC ports of which are coupled in series to form a first port;
two half-bridge subunits, DC ports of which are coupled to DC ports of the two AC/DC subunits, respectively; and
a transformer, wherein two terminals of a primary winding of the transformer are coupled to a midpoint of bridge arms of the two half-bridge subunits;
wherein the two AC/DC subunits comprises a first full bridge circuit and a second full bridge circuit cascaded to form a first rectifier circuit to convert an input first AC current into a DC current, the first full bridge circuit comprise a first bridge arm and a second bridge arm, and the second full bridge circuit comprises a third bridge arm and a fourth bridge arm, wherein the two half-bridge subunits comprises a first half-bridge circuit and a second half-bridge circuit, the first half-bridge circuit comprises a fifth bridge arm, and the second half-bridge circuit comprises a sixth bridge arm, and wherein the second bridge arm and the fifth bridge arm form a third full bridge circuit, the third bridge arm and the sixth bridge arm form a fourth full bridge circuit, and the third full bridge circuit and the fourth full bridge circuit are cascaded to form a first inverter circuit coupled to a primary winding of a high frequency isolation transformer and to convert the DC current into a second AC current; wherein, the second bridge arm and the third bridge arm are common bridge arms, the common bridge arms bear the second AC current;
or,
wherein the two AC/DC subunits comprises a third half-bridge circuit and a fourth half-bridge circuit cascaded to form a first rectifier circuit to convert an input first AC current into a DC current, the third half-bridge circuit comprises a seventh bridge arm, and the fourth half-bridge circuit comprises an eighth bridge arm, wherein the two half-bridge subunits comprises a fifth half-bridge circuit and a sixth half-bridge circuit, the fifth half-bridge circuit comprises a ninth bridge arm, and the sixth half-bridge circuit comprises a tenth bridge arm, and wherein the seventh bridge arm and the ninth bridge arm forms a fifth full bridge circuit, and the eighth bridge arm and the tenth bridge arm form a sixth full bridge circuit, and the fifth full bridge circuit and the sixth full bridge circuit are cascaded to form a first inverter circuit coupled to a primary winding of a high frequency isolation transformer and to convert the DC current into a second AC current; wherein, the seventh bride arm and the eighth bridge arm are common bridge arms, the common bridge arms bear the second AC current.

2. The power electronic conversion unit according to claim 1, further comprising:
a first passive network comprising a capacitor and/or an inductor;
wherein the first passive network couples the midpoint of the bridge arms of the two half-bridge subunits in series to the primary winding of the transformer.

3. The power electronic conversion unit according to claim 2, wherein the first passive network is a series resonant network or a parallel resonant network.

4. The power electronic conversion unit according to claim 1, wherein the two AC/DC subunits and the two half-bridge subunits are bidirectional conversion circuits.

5. The power electronic conversion unit according to claim 1, further comprising:
a secondary side AC/DC conversion unit, an AC port of which is coupled to a secondary winding of the transformer.

6. The power electronic conversion unit according to claim 5, further comprising:
a second passive network comprising a capacitor and/or an inductor;
wherein the secondary side AC/DC conversion unit is coupled to the secondary winding of the transformer via the second passive network.

7. The power electronic conversion unit according to claim 6, wherein the second passive network is a series resonant network or a parallel resonant network.

8. The power electronic conversion unit according to claim 5, wherein the secondary side AC/DC conversion unit is a bidirectional conversion circuit.

9. A power electronic conversion system comprising a plurality of power electronic conversion units;
wherein each of the power electronic conversion units comprises:
two AC/DC subunits, AC ports of which are coupled in series to form a first port;
two half-bridge subunits, DC ports of which are coupled to DC ports of the two AC/DC subunits, respectively; and
a transformer, wherein two terminals of a primary winding of the transformer are coupled to a midpoint of bridge arms of the two half-bridge subunits;
wherein the two AC/DC subunits comprises a first full bridge circuit and a second full bridge circuit cascaded to form a first rectifier circuit to convert an input first AC current into a DC current, the first full bridge circuit comprise a first bridge arm and a second bridge arm, and the second full bridge circuit comprises a third bridge arm and a fourth bridge arm, wherein the two half-bridge subunits comprises a first half-bridge circuit and a second half-bridge circuit, the first half-bridge circuit comprises a fifth bridge arm, and the second half-bridge circuit comprises a sixth bridge arm, and wherein the second bridge arm and the fifth bridge arm form a third full bridge circuit, the third bridge arm and the sixth bridge arm form a fourth full bridge circuit, and the third full bridge circuit and the fourth full bridge circuit are cascaded to form a first inverter circuit coupled to a primary winding of a high frequency isolation transformer and to convert the DC current into a second AC current; wherein, the second bridge arm and the third bridge arm are common bridge arms, the common bridge arms bear the second AC current;
or,
wherein the two AC/DC subunits comprises a third half-bridge circuit and a fourth half-bridge circuit cascaded to form a first rectifier circuit to convert an input first AC current into a DC current, the third half-bridge circuit comprises a seventh bridge arm, and the fourth half-bridge circuit comprises an eighth bridge arm, wherein the two half-bridge subunits comprises a fifth half-bridge circuit and a sixth half-bridge circuit, the fifth half-bridge circuit comprises a ninth bridge arm, and the sixth half-bridge circuit comprises a tenth bridge arm, and wherein the seventh bridge arm and the ninth bridge arm forms a fifth full bridge circuit, and the eighth bridge arm and the tenth bridge arm form a sixth full bridge circuit, and the fifth full bridge circuit and the sixth full bridge circuit are cascaded to form a first inverter circuit coupled to a primary winding of a high frequency isolation transformer and to convert the DC current into a second AC current; wherein, the seventh bridge arm and the eighth bridge arm are common bridge arms, the common bridge arms bear the second AC current.

10. The power electronic conversion system according to claim 9, wherein each of the AC/DC subunits in the plurality of power electronic conversion units is a full bridge conversion unit, and first ports of the plurality of power electronic conversion units are coupled in series to form a cascaded H-bridge structure.

11. The power electronic conversion system according to claim 9, wherein each of the AC/DC subunits in the plurality of power electronic conversion units is a full bridge conversion circuit or a half-bridge circuit, or a part of the AC/DC subunits in the plurality of power electronic conversion units are full bridge conversion circuits and the other part of the AC/DC subunits in the plurality of power electronic conversion units are half-bridge circuits, and first ports of the plurality of power electronic conversion units are coupled in series to form a MMC structure comprising an upper bridge arm and a lower bridge arm.

12. The power electronic conversion system according to claim 9, wherein the power electronic conversion system further comprises a plurality of secondary side AC/DC conversion units, and each AC port of the plurality of the AC/DC conversion units is coupled to a secondary winding of a transformer in a corresponding power electronic unit.

13. The power electronic conversion system according to claim 12, wherein all DC ports of the plurality of secondary side AC/DC conversion units are coupled in parallel.

14. The power electronic conversion system according to claim 12, wherein all DC ports of the plurality of secondary side AC/DC conversion units are coupled in series.

15. The power electronic conversion system according to claim 12, wherein some DC ports of the plurality of secondary side AC/DC conversion units are coupled in parallel, and the other DC ports of the plurality of secondary side AC/DC conversion units are coupled in series.

16. The power electronic conversion system according to claim 12, wherein all DC ports of the plurality of secondary side AC/DC conversion units are isolated individually and they do not connect with each other.

* * * * *